United States Patent
Chung et al.

(10) Patent No.: US 10,294,338 B2
(45) Date of Patent: May 21, 2019

(54) METHOD OF MAKING THERMOPLASTIC VULCANIZATES AND THERMOPLASTIC VULCANIZATES MADE THEREFROM

(71) Applicant: ExxonMobil Chemical Patents Inc., Baytown, TX (US)

(72) Inventors: Oscar O. Chung, Houston, TX (US); Porter C. Shannon, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/548,788

(22) PCT Filed: Dec. 15, 2015

(86) PCT No.: PCT/US2015/065776
§ 371 (c)(1),
(2) Date: Aug. 4, 2017

(87) PCT Pub. No.: WO2016/160083
PCT Pub. Date: Oct. 6, 2016

(65) Prior Publication Data
US 2018/0030219 A1 Feb. 1, 2018

Related U.S. Application Data

(60) Provisional application No. 62/142,273, filed on Apr. 2, 2015.

(51) Int. Cl.
| | | |
|---|---|---|
| *C08J 3/24* | (2006.01) | |
| *C08J 3/22* | (2006.01) | |
| *C08L 23/16* | (2006.01) | |
| *C08K 3/04* | (2006.01) | |
| *C08L 23/12* | (2006.01) | |
| *B29B 7/48* | (2006.01) | |
| *B29B 13/02* | (2006.01) | |
| *C08J 3/00* | (2006.01) | |
| *B29C 48/29* | (2019.01) | |
| *B29C 48/28* | (2019.01) | |
| *B29C 48/40* | (2019.01) | |
| *C08K 3/34* | (2006.01) | |
| *C08J 3/20* | (2006.01) | |
| *B29C 48/285* | (2019.01) | |
| *B29C 48/385* | (2019.01) | |
| *B29K 23/00* | (2006.01) | |
| *B29C 48/00* | (2019.01) | |

(52) U.S. Cl.
CPC ............... *C08J 3/246* (2013.01); *B29B 7/48* (2013.01); *B29B 13/02* (2013.01); *B29C 48/2886* (2019.02); *B29C 48/29* (2019.02); *B29C 48/297* (2019.02); *B29C 48/385* (2019.02); *B29C 48/40* (2019.02); *C08J 3/005* (2013.01); *C08J 3/203* (2013.01); *C08J 3/226* (2013.01); *C08K 3/04* (2013.01); *C08K 3/346* (2013.01); *C08L 23/12* (2013.01); *C08L 23/16* (2013.01); *B29C 48/022* (2019.02); *B29K 2023/16* (2013.01); *C08J 2323/16* (2013.01); *C08J 2423/12* (2013.01); *C08L 2205/02* (2013.01); *C08L 2207/04* (2013.01); *C08L 2312/04* (2013.01)

(58) Field of Classification Search
CPC .. C08J 3/246; C08J 3/226; C08J 3/005; B29C 47/1045; B29C 47/1063; B29C 47/1081; B29C 47/366; B29C 47/40; B29C 47/0004; C08L 23/16; C08L 23/12; C08K 3/04; C08K 3/346
USPC ........................................................ 524/447
See application file for complete search history.

(56) References Cited

U.S. PATENT DOCUMENTS

| | | |
|---|---|---|
| 8,653,197 B2 | 2/2014 | Ellul et al. |
| 9,328,053 B2 | 5/2016 | Bai et al. |
| 9,422,408 B2 | 8/2016 | Roche et al. |
| 9,556,087 B2 | 1/2017 | Dakka et al. |
| 9,580,572 B2 | 2/2017 | Dakka et al. |
| 9,663,417 B2 | 5/2017 | Dakka et al. |
| 9,688,602 B2 | 6/2017 | Dakka et al. |
| 9,708,230 B2 | 7/2017 | Salciccioli et al. |
| 2006/0293454 A1* | 12/2006 | Nadella ................... C08L 23/16 525/191 |
| 2007/0135571 A1* | 6/2007 | Ellul ..................... B29C 47/0004 525/88 |
| 2008/0033089 A1 | 2/2008 | Ellul et al. |

(Continued)

FOREIGN PATENT DOCUMENTS

| | | |
|---|---|---|
| WO | 00/26296 A | 5/2000 |
| WO | 2016/160084 A | 10/2016 |

OTHER PUBLICATIONS

U.S. Appl. No. 62/320,014, filed Apr. 8, 2016, Dakka et al., "Oxidation of Methyl-substituted Biphenyl Compounds".

*Primary Examiner* — Michael Bernshteyn (57) ABSTRACT

The present disclosure relates to a method for making thermoplastic vulcanizates comprising dynamically vulcanizing an elastomer in an extrusion reactor with a curative in the presence of a thermoplastic resin to form a thermoplastic vulcanizate. Process oil is added to the extrusion reactor at a first, second, and third location, where the amount of process oil introduced at the first oil injection location is less than that introduced at the second oil injection location, where the third oil injection location is downstream of where the curative is introduced to the extrusion reactor, and where the thermoplastic vulcanizate comprises at least 25 wt % of oil based on the weight of the thermoplastic vulcanizate.

27 Claims, 1 Drawing Sheet

(56) References Cited

U.S. PATENT DOCUMENTS

| | | |
|---|---|---|
| 2011/0028637 A1 | 2/2011 | Ellul et al. |
| 2011/0112238 A1* | 5/2011 | Ellul ........................ C08L 23/10 |
| | | 524/518 |
| 2013/0005997 A1 | 1/2013 | Sagehashi et al. |
| 2013/0059977 A1* | 3/2013 | Kurokawa .............. C08L 23/02 |
| | | 525/190 |
| 2013/0316111 A1 | 11/2013 | Wu et al. |
| 2014/0378697 A1 | 12/2014 | de Smit et al. |
| 2015/0361011 A1 | 12/2015 | Salciccioli et al. |
| 2016/0115095 A1 | 4/2016 | Dakka et al. |
| 2016/0176785 A1 | 6/2016 | Salciccioli et al. |

* cited by examiner

METHOD OF MAKING THERMOPLASTIC VULCANIZATES AND THERMOPLASTIC VULCANIZATES MADE THEREFROM

CROSS REFERENCE TO RELATED APPLICATIONS

This application is a National Phase Application claiming priority to PCT Application Serial No. PCT/US2015/065776 filed Dec. 15, 2015, and claims the benefit of priority from U.S. Provisional Application No. 62/142,273, filed Apr. 2, 2015, both of which are incorporated herein by their reference.

BACKGROUND OF THE INVENTION

Thermoplastic vulcanizates ("TPVs") comprise blends of dynamically cured elastomers and thermoplastic resins where the elastomer is dispersed within the thermoplastic resin phase as finely-divided elastomeric particles. TPVs advantageously demonstrate many of the properties of thermoset elastomers, yet are processable as thermoplastics.

Typically the elastomer used in forming the TPV is an ethylene, α-olefin, diene rubber copolymer, such as an ethylene, propylene, and diene monomer ("EPDM") rubber. EPDMs produced using Ziegler-Natta catalysts have been favored for making TPVs due to their high molecular weight (as measured by their Mooney viscosity). However, this high Mooney viscosity, e.g., greater than 200 ML(1+4@ 125° C.), can result in difficulties when processing the rubber. As such, extender oils are often added to the polymer production process to reduce the apparent viscosity, and commercially available very high molecular weight EPDM rubbers typically contain from about 50 to about 125 phr of extender oil. While this aids in the extrusion of the EPDM, the oil-extended EPDMs are typically provided in bale form. As such an additional step is needed in the TPV production to granulate and partition the rubber. This increases the operation complexity and can require an addition of a large amount of extender filler and/or partitioning agents, such as clay. However, partitioning agents, such as a clay, are high density materials, and therefore a large addition of clay results in an increase of the density of the TPV.

EPDM rubbers have been produced using metallocene catalyst systems, for example as described in WO 2000/26296. Metallocene EPDMs can be advantageously supplied in pellet form and can contain little to no extender oil. However, when low- or non-oil extended EPDM rubbers are used to make TPVs, a large amount of process oil typically needs to be added into the extruder to ensure proper mixing of the TPV ingredients. However, large amounts of process oil can be difficult to consistently mix and incorporate into the thermoplastic vulcanizate which can lead to compounding process instability and undesirable TPV properties.

U.S. Patent Application No. 2008/0033089 describes a TPV composition comprising a dynamically-cured rubber; from about 20 to about 300 phr thermoplastic resin and from about 30 to about 250 phr additional oil. The rubber is a multimodal composition comprising 10-50 phr of extender oil, and 45-75 wt % of a first polymer fraction having a Mooney viscosity greater than 150 ML (1+4@ 125° C.) and 25 to 55 wt % of a second polymer fraction having a Mooney viscosity of 20-120 ML, where the polymer fractions have been polymerizing using a Ziegler-Natta catalyst system. The Examples in US 2008/0033089 were conducted in Brabender batch mixers.

US Patent Application Publication No. 2011/0028637 describes methods for preparing a TPV, using an elastomer that is not prepared by gas-phase polymerization methods and which has less than 75 phr oil. The method includes introducing a curative to the extruder after introducing the elastomer, introducing oil to the extruder after introducing the elastomer but before or together with introducing the curative, and introducing additional oil to the extruder after introducing the curative.

U.S. Patent Application Publication No. US 2011/0112238 describes a process for preparing a TPV using an olefinic copolymer rubber that is characterized by a multimodal molecular weight, an average branching index of greater than 0.8, and that includes less than 10 phr oil and less than 1 phr non-rubber particulate, and that is in the form of granules having a particle size less than 8 mm. The rubber is introduced to the extrusion reactor contemporaneously or sequentially with a thermoplastic resin, an oil, and a cure system.

U.S. Patent Application Publication No. 2013/0316111 describes a composition comprising: (A) a first composition comprising: i) a first interpolymer comprising, in polymerized form, ethylene, an alpha-olefin, and a nonconjugated polyene; ii) a second interpolymer comprising, in polymerized form, ethylene, an alpha-olefin and a nonconjugated polyene; and wherein the first composition has an MWD less than, or equal to, 3.5, a Mooney Viscosity (ML (1+4 @125° C.)) greater than, or equal to, 80, and an [(ML(1+4 @125° C.))/Mw(conv)]*1000 greater than 0.429 mole/g; (B) a thermoplastic polymer; and (C) a vulcanization agent.

There remains a need for methods of producing TPVs that have good physical properties using elastomers that have little to no oil extension that are provided in pellet or granule form. For example, there is a desire to provide TPVs that exhibit good physical properties, such as low extrusion surface roughness, that are easily processable.

SUMMARY OF THE INVENTION

Described herein are methods for making thermoplastic vulcanizates and thermoplastic vulcanizates made therefrom. The method comprises the steps of (i) introducing an elastomer comprising less than 25 phr of extender oil to an extrusion reactor; (ii) introducing a thermoplastic resin to the extrusion reactor; (iii) introducing at least 7 phr of an inert solid particulate to the extrusion reactor; (iv) introducing a first amount of process oil to the extrusion reactor at a first oil injection location; (v) introducing a second amount of process oil to the extrusion reactor at a second oil injection location, where the second oil injection location is downstream of the first oil injection location, and wherein the second amount of process oil is greater than the first amount of process oil; (vi) introducing a curative to the extrusion reactor a location that is downstream of the second oil injection location; (vii) introducing a third amount of process oil to the extrusion reactor at a third oil injection location, where the third oil injection location is downstream of the location where the curative is introduced to the extrusion reactor; and (viii) dynamically vulcanizing the elastomer with the curative in the presence of the thermoplastic resin to form the thermoplastic vulcanizate. Preferably the total weight percent of oil in the thermoplastic vulcanizate is greater than 25 wt % based on the weight of the thermoplastic vulcanizate and the amount of process oil injected at the first and second oil injection locations comprises at least 30 wt % of the total weight of the process oil introduced to the extrusion reactor.

It has been surprisingly found that the method described herein can make use of pelletized non-oil extended elastomers in making thermoplastic vulcanizates. It has also found that advantageous properties, such as improved surface performance and reduced specific gravity can be achieved by selecting and adjusting the process oil additions and process additives, without deteriorating other physical and mechanical properties, such as hardness, elongation properties, tension set etc.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

As used herein, when a polymer is referred to as comprising a monomer, the monomer is present in the polymer in the polymerized form of the monomer or in the derivative form of the monomer. The "polymer" may be used to refer to homopolymers and copolymers. As used herein, the term "copolymer" shall refer to any polymer formed from at least two different monomers, including terpolymers.

As used herein, when a polymer composition or blend is said to comprise a certain percentage, wt %, of a monomer, that percentage of monomer is based on the total amount of monomer units in all the polymer components of the composition or blend.

As used herein, a "thermoplastic vulcanizate" or "TPV" is broadly defined as any material that includes a dispersed, at least partially vulcanized, rubber within a thermoplastic resin. A TPV composition can further include additive oil, other ingredients, other additives, or combinations thereof.

As used herein, the term "vulcanizate" means a composition that includes some component (e.g., rubber) that has been vulcanized. The term "vulcanized" is defined herein in its broadest sense, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is dynamic vulcanization, discussed below, which produces a vulcanizate.

As used herein, the term "dynamic vulcanization" means vulcanization or curing of a curable rubber blended with a thermoplastic resin under conditions of shear at temperatures sufficient to plasticize the mixture. In preferred embodiments, the rubber is simultaneously crosslinked and dispersed as micro-sized particles within the thermoplastic resin. Depending on the degree of cure, the rubber to thermoplastic resin ratio, compatibility of the rubber and thermoplastic resin, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the TPV. For example, in a TPV comprising an only partially vulcanized rubber at least 5 wt % and less than 20 wt %, or 30 wt %, or 50 wt % of the crosslinkable rubber is extractable from the specimen of the TPV in boiling xylene.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in U.S. Pat. No. 4,311,628, and the portions of the patents referring to that technique are hereby incorporated by reference.

As used herein, a "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber less than 4 wt %, or less than 3 wt %, or less than 2 wt %, or less than 1 wt % of the crosslinkable rubber is extractable from the specimen of the TPV in boiling xylene. In some embodiments, in a TPV comprising a fully vulcanized rubber from 0.5 to 2.0 wt % of the crosslinkable rubber is extractable from the specimen of the TPV in boiling xylene.

As used herein "phr" means parts per hundred parts of rubber. Thus, for example, a thermoplastic vulcanizate that comprises 10 phr of an additive, contains 10 parts by weight of the additive per 100 parts by weight of the elastomer in the thermoplastic vulcanizate.

Elastomer

The TPVs described herein comprise an elastomer. The "elastomer" or "rubber component" can comprise any material that is considered by persons skilled in the art to be a "rubber", preferably a crosslinkable rubber (i.e., prior to vulcanization) or crosslinked rubber (i.e., after vulcanization). The elastomer may comprise one elastomer or may comprise blends of two or more elastomers, where the elastomers are different in composition or are the same in composition but have different properties.

Non-limiting examples of elastomers include olefin-containing rubbers, butyl rubber, natural rubber, styrene-butadiene copolymer rubber, butadiene rubber, acrylonitrile rubber, halogenated rubbers such as brominated and chlorinated isobutylene-isoprene copolymer rubber, butadiene-styrene-vinyl pyridine rubber, urethane rubber, polyisoprene rubber, epichlorohydrin terpolymer rubber, polychloroprene rubber, and mixtures thereof.

In one or more embodiments, vulcanizable elastomers include polyolefin copolymer rubbers, such as ethylene-α-olefin copolymer rubbers and ethylene-α-olefin-diene rubbers. Useful elastomers include those made from one or more of ethylene and higher α-olefins, which may include, but are not limited to, the preferred propylene, 1-butene, 1-hexene, 4-methyl-1 pentene, 1-octene, 1-decene, or combinations thereof, plus one or more copolymerizable, multiply unsaturated comonomer, such as diolefins, or diene monomers. In certain embodiments, the α-olefins are propylene, 1-hexene, 1-octene, or combinations thereof.

The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene, divinyl benzene, and the like, or a combination thereof. In preferred embodiments, the diene monomers are 5-ethylidene-2-norbornene and/or 5-vinyl-2-norbornene.

Useful elastomeric copolymers may contain from about 50 to about 95 wt % ethylene-derived units, or from about 55 to about 95 wt %, or from about 60 to about 90 wt %, or from about 65 to about 85 wt %, or from about 70 to about 80 wt % ethylene-derived units, where desirable ranges may include ranges from any lower limit to any upper limit. The amount of ethylene-derived units in the copolymer may be determined according to ASTM D3900. In one or more embodiments, the copolymer may contain from about 5 to about 50 wt %, or from about 5 to about 40 wt %, or from about 10 to about 30 wt %, α-olefin-derived units, where desirable ranges may include ranges from any lower limit to any upper limit.

Where the copolymer contains diene units, the copolymers may contain from 0.1 to about 14 wt %, or from about 0.1 to about 10 wt %, or from about 1 to about 8 wt %, or from about 2 to about 7 wt % diene-derived units, where desirable ranges may include ranges from any lower limit to any upper limit. The wt % of diene-derived units may be determined according to ASTM D-6047.

Preferred elastomers comprise less than about 25 phr of extender oil. That is, in preferred embodiments, the elastomer, as it is added to the extrusion reactor comprises less than 25 phr of oil. Accordingly, in some embodiments, the elastomer, as it is added to the extrusion reactor, comprises less than about 20 phr, or less than about 15 phr, or less than about 10 phr, or less than about 5 phr, or less than 3 phr, or less than about 1 phr oil. In particular embodiments, the elastomer, as it is added to a reactor, is substantially free of extender oil or contains zero extender oil.

The elastomer may have a Mooney Viscosity (ML (1+4@ 125° C.)) of from about 5 to about 250, or from about 10 to about 120, or from about 15 to about 100, or from about 20 to about 90, or from about 30 to about 80, or from about 40 to about 70, where the Mooney Viscosity is that of the neat polymer and where desirable ranges may include ranges from any lower limit to any upper limit. As used herein, the Mooney Viscosity is measured on non-oil extended rubber, or practically, on the rubber as it exits the polymerization process prior to oil extension. As used herein, Mooney viscosity is reported using the format: Rotor ($_{[pre\text{-}heat\ time,\ min.]+[shearing\ time,\ min.]}$@ measurement temperature, ° C., such that $ML_{1+4}$ @125° C. indicates a Mooney viscosity determined using the ML or large rotor according to ASTM D 1646, for a pre-heat time of 1 minute and a shear time of 4 minutes, at a temperature of 125° C. Unless otherwise specified, Mooney viscosity is reported herein as ML(I+4 @125° C.) in Mooney units according to ASTM D-1646.

In preferred embodiments, the elastomer, as it is added to the extrusion reactor, is in a pellet form that can freely flow. For example, the elastomer may be in pellet form such that the pellets as they are added to the extrusion reactor having an average diameter of greater than about 0.1 mm, or greater than about 0.3 mm, or greater than about 0.5 mm, or greater than about 0.8 mm, or greater than 1.0 mm, and less than about 10 mm, or less than about 8 mm, or less than about 5 mm, or less than about 4 mm, or less than about 3 mm, or less than about 2 mm.

Useful EPDM rubbers may include those that are formed utilizing a metallocene catalyst. For example, useful EPDM rubbers may include those described in WO 00/26296, content of which are incorporated herein by reference.

An EPDM rubber made using metallocene catalyst may have a relatively narrow molecular weight distribution, or polydispersity (MWD). For example the EPDM rubber may have a MWD of from about 1 to about 5, or from about 1.5 to about 4, or from about 1.8 to about 2.5, where desirable ranges may include ranges from any lower limit to any upper limit. The EPDM rubber may have unimodal or multimodal molecular weight distribution, and in one preferred embodiment, the elastomer has a unimodal molecular weight distribution. In one or more embodiments, the EPDM rubber made using metallocene catalyst, compared with those made using Ziegler-Natta catalyst, can have a relatively lower weight average molecular weight, for example, from about 10,000 to about 500,000; and a number average molecular weight of from about 10,000 to about 100,000.

Commercially available EPDM rubbers that are useful in this invention may include certain products available from ExxonMobil Chemical sold under the Vistalon™ tradename.

Thermoplastic Resin

The thermoplastic vulcanizate comprises a thermoplastic resin. For example, the thermoplastic resin may be a polymer or polymer blend considered by persons skilled in the art as being thermoplastic in nature, e.g., a polymer that softens when exposed to heat and returns to its original condition when cooled to room temperature. The thermoplastic resin component may contain one or more polyolefins, including polyolefin homopolymers and polyolefin copolymers.

Illustrative thermoplastic resins may be prepared from mono-olefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In preferred embodiments, the olefinic thermoplastic resin comprises, or consists of, polypropylene. The term "polypropylene" as used herein broadly means any polymer that is considered a "polypropylene" by persons skilled in the art and includes homo, impact, and random copolymers of propylene. Preferably, the polypropylene used in the TPVs described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units, with the remainder derived from olefins, such as ethylene, and/or $C_4$-$C_{10}$ α-olefins.

The thermoplastic resin may have a melting temperature of at least 110° C., or at least 120° C., or at least 130° C., and may range from 110° C. to 170° C. or higher as measured by DSC.

The thermoplastic resin may have a melt flow rate "MFR" as measured by ASTM D1238 at 230° C. and 2.16 kg weight of from about 0.1 to 100 g/10 min. In some embodiments, the TPV comprises at least one thermoplastic resin having a fractional MFR, such a polypropylene having a fractional MFR of less than about 2 g/10 min, or less than about 1.5 g/10 min, or less than about 1 g/10 min. In some embodiments, the TPV may comprises a thermoplastic resin, such as a polypropylene, having a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the TPV may further comprise a thermoplastic resin, such as a polypropylene, having a MFR of from a low of about 5, 10, or 15 g/10 min to a high of about 20, 25, or 30 g/10 min, where desirable ranges may include ranges from any lower limit to any upper limit.

The polyolefinic thermoplastic resins may have a $M_w$ from about 200,000 to about 700,000, and a $M_n$ from about 80,000 to about 200,000. These resins may have a $M_w$ from about 300,000 to about 600,000, and a $M_n$ from about 90,000 to about 150,000.

In one or more embodiments, the thermoplastic polymers may be characterized by a heat of fusion (Hf), as determined by DSC procedures according to ASTM E 793, of at least 100 J/g, in other embodiments at least 180 J/g, in other embodiments at least 190 J/g, and in other embodiments at least 200 J/g.

Other exemplary thermoplastic resins, in addition to crystalline or semi-crystalline, or crystallizable, polyolefins, include, polyimides, polyesters (nylons), poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics. Molecular weights are generally equivalent to those of the polyolefin thermoplastics but melt temperatures can be much higher. Accordingly, the melt temperature of the thermoplastic resin chosen should not exceed the temperature at which the elastomer will breakdown, that is when its molecular bonds begin to break or scission such that the molecular weight of the elastomer begins to decrease.

Curatives

Any curative agent that is capable of curing or crosslinking the elastomeric copolymer in the thermoplastic vulcanizate may be used. Some non-limiting examples of these curatives include phenolic resins, peroxides, maleimides, and silicon-containing curatives.

In preferred embodiments, the TPV is cured using a phenolic resin vulcanizing agent. Phenolic resin curatives can also be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred in some embodiments. In some embodiments, a blend of octyl phenol and nonylphenol-formaldehyde resins are employed. The blend may include from 25 wt % to 40 wt % octyl phenol and from 75 wt % to 60 wt % nonylphenol, more preferably, the blend includes from 30 wt % to 35 wt % octyl phenol and from 70 wt % to 65 wt % nonylphenol. In some embodiments, the blend includes about 33 wt % octylphenol-formaldehyde and about 67 wt % nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins (also available in a 30/70 weight percent paraffinic oil solution under the trade name HRJ-14247A). SP-1045 is believed to be an octylphenol-formaldehyde resin that contains methylol groups. The SP-1044 and SP-1045 resins are believed to be essentially free of halogen substituents or residual halogen compounds. By "essentially free of halogen substituents," it is meant that the synthesis of the resin provides for a non-halogenated resin that may only contain trace amounts of halogen containing compounds.

Preferred phenolic resin may have a structure according to the following general formula:

where Q is a divalent radical selected from the group consisting of —CH2- and CH2-O—CH 2-; m is zero or a positive integer from 1 to 20 and R is an alkyl group. Preferably, Q is the divalent radical —CH2-O—CH2-, m is zero or a positive integer from 1 to 10, and R is an alkyl group having less than 20 carbon atoms. Still more preferably, m is zero or a positive integer from 1 to 5 and R is an alkyl group having between 4 and 12 carbon atoms.

The phenolic resin can be introduced into the extrusion reactor in a form of phenolic resin-in-oil ("RIO"), which means the phenolic resin is believed being dispersed and/or dissolved in a mineral oil. The mineral oil can include aromatic mineral oils, naphthenic mineral oils, and paraffinic mineral oils. The method of dispersing and/or to dissolving an phenol resin in a mineral oil may be any method known in the art, for example, a method in which the phenolic resin and the mineral oil are fed at once into a glass container equipped with a stirrer and heated under stirring on a water bath of 60 to 100° C. for 1 to 10 hours, as described in U.S. Patent Application Publication No. 2013/0046049 A1.

Other examples of suitable phenolic resins include those described in U.S. Pat. No. 8,207,279 and U.S. Patent Application No. 2013/0046049 A1.

In one or more embodiments, the phenolic resin may be employed in an amount from about 2 to about 20 phr, or from about 3 to about 15 phr, or from about 4 to about 10 phr.

Cure Accelerator

The curative may be used in conjunction with a cure accelerator. The cure accelerator may be used to increase the degree of vulcanization of the TPV. Useful cure accelerators include metal halides, such as stannous chloride, stannous chloride anhydride, stannous chloride dehydrate, and ferric chloride. In preferred embodiments, the cure accelerator comprises anhydrous stannous chloride. The cure accelerator is introduced into the vulcanization process as part of a masterbatch as described herein.

The stannous chloride can be used in its hydrous ($SnC_2 2H_2O$) or anhydrous ($SnCl_2$) form. The stannous chloride can be used in a powdered, granulated, or flake form.

In some embodiments the cure accelerator is added in an amount of less than 1 wt % based on the total weight of the TPV. In some embodiments, stannous chloride may be used in an amount of from about 0.5 to about 2.0 phr, or from about 1.0 to about 1.5 phr, or from about 1.2 to about 1.3 phr.

Metal Oxide

In some embodiments, metal oxides may be added to the vulcanization process. The metal oxide can act as a scorch retarder in the vulcanization process. Useful metal oxides include zinc oxides having a mean particle diameter of about 0.05 to about 0.15 µm. Useful zinc oxide can be obtained commercially under the tradename Kadox™ 911 (Horsehead Corp.).

In some embodiments, from about 0.1 to about 6.0 phr, or from about 1.0 to about 5.0 phr, or from about 2.0 to about 4.0 phr of zinc oxide may be employed.

Process Oil

The thermoplastic vulcanizates comprises a process oil, such as a mineral oil, a synthetic oil, or a combination thereof. These oils may also be referred to as plasticizers. Mineral oils may include aromatic, naphthenic, paraffinic, and isoparaffinic oils. In one or more embodiments, the mineral oils may be treated or untreated. Useful mineral oils include oils obtained under the tradename SUNPAR™ (Sun Chemicals) and PARALUX™ (Chevron).

The term "process oil" herein refers to oil that is added alone to the extrusion reactor, and does not include oil(s) contained in the elastomer which are referred to as "extender oil" herein. The term "process oil" also does not include oils that are introduced to the extrusion reactor as part of a curative dispersion.

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and in other embodiments from about 700 g/mole to about 1,300 g/mole. Exemplary synthetic oils include polyisobutylene, poly(isobutylene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cP, in other embodiments in excess of about 100 cP, and in other embodiments in excess of about 190 cP, where the viscosity is measured by a Brookfield viscometer according to ASTM D-4402 at 38° C. In these or other embodiments, the viscosity of these oils can be less than 4,000 cP and in other embodiments less than 1,000 cP.

Useful synthetic oils can be commercially obtained under the tradenames Polybutene™ (Soltex; Houston, Tex.), and Indopol™ (Innouvene). White synthetic oil is available under the tradename SPECTRASYN™ (ExxonMobil), formerly SHF Fluids (Mobil). Oils described in U.S. Pat. No. 5,936,028, which is incorporated herein by reference, may also be employed. It is believed that synthetic oils may provide enhanced low temperature performance. Also, high temperature performance may be enhanced based upon molecular structure.

In one or more embodiments, the process oils may include organic esters, alkyl ethers, or combinations thereof including those disclosed in U.S. Pat. Nos. 5,290,866 and 5,397,832, which are incorporated herein by reference. In one or more embodiments, the organic esters and alkyl ether esters may have a molecular weight that is generally less than about 10,000. In one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

Processing Additives

In one or more embodiments of this invention, the thermoplastic vulcanizate comprises one or more processing additives such as inert solid particulates. Exemplary inert solid particulates comprise clay, carbon black, talc, calcium carbonate, silica, alumina, titanium dioxide, wood flour, and mixtures thereof. In preferred embodiments, the inert solid particulate can comprise clay. It has been found that addition of the inert solid particulate together with or near the addition of the elastomer pellets can help achieve improved dispersion of the elastomer within the thermoplastic vulcanizate.

The inert solid particulates can have an average particle size of less than about 10 micrometers, or less than about 7 micrometers, or less than about 5 micrometers, or less than about 3 micrometers.

In some embodiments, the inert solid particulates are introduced into the extrusion reactor in powder or flake form. In some embodiments, the inert solid particulates can be introduced into the extrusion reactor in the forms of pastes or slurries in oil.

Other Additives

In addition to the thermoplastic resin, the elastomer, curatives, process oil(s), and inert solid particulates, the composition may also include reinforcing and non-reinforcing agent, antioxidants, stabilizers, lubricants, antiblocking agents, anti-static agents, waxes, foaming agents, pigments, flame retardants and other processing aids known in the plastics or rubber compounding art. These additives can comprise up to about 50 wt. % of the total composition.

Amounts

The thermoplastic vulcanizates described herein may contain a sufficient amount of the elastomer to form elastomeric compositions of matter. The skilled artisan will understand that elastomeric compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 10 wt %, or at least 15 wt %, or at least 20 wt %, or at least 25 wt %, or at least 30 wt %, or at least 45 wt %, or at least 65 wt % of elastomer based upon the total weight of the thermoplastic vulcanizates. In these or other embodiments, the amount of elastomer within the thermoplastic vulcanizates can be from about 10 to about 80 wt %, or from about 15 to about 70 wt %, and in other embodiments from about 20 to about 50 wt %, based on the total weight of the thermoplastic vulcanizate.

The amount of thermoplastic resin (i.e., uncured polymer within the thermoplastic phase) within the thermoplastic vulcanizates can be from about 5 to about 85 wt %, or from about 7 to about 75 wt %, and in other embodiments from about 10 to about 60 wt %, based on the total weight of the thermoplastic vulcanizate.

The amount of thermoplastic resin in the thermoplastic vulcanizate composition may be from about 25 to about 250 phr, or from about 30 to about 150 phr, or from about 40 to about 100 phr.

The total amount of process oil in the thermoplastic vulcanizate compositions can at least 25 wt %, or at least 30 wt %, or at least 32 wt %, or at least 35 wt %, based on the weight of the thermoplastic vulcanizate. In some embodiments, the total amount of process oil in the thermoplastic vulcanizate can be at least 80 phr, or at least 100 phr, or at least 105 phr, or at least 110 phr, and can be less than 200 phr, or less than 175 phr, or less than 160 phr, or less than 150 phr.

Processing additives, such as the inert solid particulate, may be present in the thermoplastic vulcanizate in an amount of at least 7 phr, or at least 10 phr, or at least 12 phr, or at least 15 phr, or at least 18 phr. In some embodiments, the inert solid particulate is present in the thermoplastic vulcanizate in an amount of less than 50 phr, or less than 45 phr, or less than 42 phr, or less than 40 phr, or less than 35 phr, or less than 30 phr. For example, in some embodiments, the inert solid particulate may be present in the thermoplastic vulcanizate in an amount of about 10 phr to about 50 phr, or from about 10 phr to about 40 phr. With reference to the amount of inert solid particulates introduced to the extrusion reactor described in this paragraph, this amount may only include inert solid particulates that are introduced directly to the extrusion reactor. That is, processing additives, such as carbon black, that are added as part of a masterbatch may not count towards the amount of inert solid particulates described herein, and may be added to the thermoplastic vulcanizate in any amount.

The skilled artisan will be able to readily determine a sufficient or effective amount of curative to be employed without undue calculation or experimentation. The amount of curative should be sufficient to at least partially vulcanize the elastomeric polymer, and the elastomeric polymer may be completely vulcanized. Where a phenolic resin curative is employed, a vulcanizing amount curative may comprise from about 1 to about 20 phr, or from about 3 to about 16 phr, or from about 4 to about 12 phr.

Method of Making Thermoplastic Vulcanizates

The present invention provides methods for making a thermoplastic vulcanizate composition, the method comprising introducing an elastomer to a extrusion reactor; introducing a thermoplastic resin to the extrusion reactor; introducing process oil to the extrusion reactor; introducing a curative to the extrusion reactor; and dynamically vulcanizing the elastomer with the curative in the presence of the thermoplastic resin to form the thermoplastic vulcanizate. The process oil is introduced to the extrusion reactor in at least three parts at three different locations along the length of the extrusion reactor.

The dynamic vulcanization may occur within a variety of extrusion reactors, such as continuous extrusion reactors, such as multiple-screw extruders. The various pieces of equipment that can be employed includes those described in "Mixing Practices Incorporating Twin-Screw Extruders," by Andersen, and "Intermeshing Twin-Screw Extruders" by Sakai, Chapters 20 and 21, MIXING AND COMPOUNDING OF POLYMERS: THEORY AND PRACTICE by Ica Manas-Zloczower and Zebev Tadmor, (New York: Hanser, 1994). One or more pieces of processing equipment can be used, either in tandem or series. Examples of processing equipment include Buss-co kneader, planetary extruder, co- or counter rotating multi screw extruders, with two or more screw tips, co-rotating intermixing extruder with two or more screws, ring extruder. In preferred embodiments a multi-screw extruder, such as a twin-screw extruder, is used. The use of extrusion reactors is further described in U.S. Pat. Nos. 4,594,390; 4,130,535; 4,311,628; 4,594,390; 6,147,160; and 6,042,260, as well as patent publications US 2006/0293457 and WO 2004/009327.

As described above, the process oil is introduced into the extrusion reactor in at least three parts. In some embodiments, the process oil is introduced to the extrusion reactor, in three parts, or in four parts, or in five parts. At least two parts of the process oil are introduced to the extrusion reactor upstream of the curative addition, that is, at least two parts of the process oil are added to the extrusion reactor at a location that is upstream of the location where the curative is added. The process oil added upstream of the curative addition may be referred to as "upstream addition of oil". At least one part of the process oil is introduced to the extrusion reactor downstream of the curative addition, which may be referred to as "downstream addition of oil". Thus, the method of this invention includes both upstream and downstream additions of oil.

In some embodiments, the method for making the thermoplastic vulcanizate comprises introducing a first amount of process oil to the extrusion reactor at a first oil injection location, introducing a second amount of process oil to the extrusion reactor at a second oil injection location that is downstream from the first oil injection location, and introducing a third amount of process oil to the extrusion reactor at a third oil injection location that is downstream from the second oil injection location and that is downstream of the location where the curative is introduced to the extrusion reactor. In preferred embodiments, the first and the second oil injection locations are downstream of location where the elastomer is introduced to the extrusion reactor. In some embodiments, the extrusion reactor utilizes mixing elements between the first and second oil injection locations. For example, in a multi-screw extruder, the screws may possess conveying zones and mixing zones, and at least one of the mixing zones is between the first and second oil injection locations.

In one or more embodiments, the upstream additions of oil can be increased in amount from upstream to downstream locations. That is, the amount of first upstream addition of oil is less than the amount of the second upstream addition of oil, which is less than the third upstream addition of oil, and so forth. For example, in one embodiment where the upstream additions of oil include a first upstream addition of oil and a second upstream addition of oil and where the first addition is upstream of the second addition, then the first upstream addition of oil is in a less amount than the second upstream addition of oil. In other words, the amount of process oil introduced at the second oil injection location is greater than that introduced at the first oil injection location.

In embodiments where the method of making the thermoplastic vulcanizate comprises introducing a first amount, a second amount, and a third amount of process oil, the first amount of process oil may comprise at least 5 wt %, or at least 7 wt %, or at least 10 wt %, or at least 15 wt %, or at least 17 wt %, or at least 20 wt %, or at least 25 wt %, of the total amount of process oil in the thermoplastic vulcanizate. For example, the percent of the total amount of process oil in the thermoplastic vulcanizate that is introduced to the extrusion reactor at the first oil injection site may be less than about 50 wt %, or less than about 45 wt %, or less than about 40 wt %, or less than about 35 wt %.

In embodiments where the method of making the thermoplastic vulcanizate comprises introducing a first amount, a second amount, and a third amount of process oil, the second amount of process oil may comprise at least 10 wt %, or at least 15 wt %, or at least 17 wt %, or at least 20 wt %, or at least 25 wt %, or at least 30 wt %, or at least 35 wt %, or at least 40 wt % of the total amount of process oil in the thermoplastic vulcanizate. For example, the percent of the total amount of process oil in the thermoplastic vulcanizate that is introduced to the extrusion reactor at the second oil injection site may be less than about 70 wt %, or less than about 65 wt %, or less than about 60 wt %, or less than about 55 wt %, or less than about 50 wt %.

In embodiments where the method of making the thermoplastic vulcanizate comprises introducing a first amount, a second amount, and a third amount of process oil, the third amount of process oil may comprise at least 15 wt %, or at least 20 wt %, or at least 25 wt %, or at least 30 wt %, or at least 35 wt %, or at least 40 wt %, or at least 45 wt %, of the total amount of process oil in the thermoplastic vulcanizate. For example, the percent of the total amount of process oil in the thermoplastic vulcanizate that is introduced to the extrusion reactor at the third oil injection site may be less than about 75 wt %, or less than about 70 wt %, or less than about 65 wt %, or less than about 60 wt %.

The total amount of process oil injected at the first and second oil injection locations may comprise at least 30 wt %, or at least 35 wt %, or 40 wt %, or at least 45 wt %, or at least 50 wt % of the total weight of the process oil introduced to the extrusion reactor. In some embodiments, the total amount of process oil injected at the first and second oil injection locations may be less than 70 wt %, or less than 65 wt %, or less than 60 wt %, or less than 55 wt % of the total weight of process oil introduced to the extrusion reactor. For example, the total amount of process oil injected at the first and second oil injection locations may comprise from about 30 wt % to about 70 wt %, or from about 30 wt % to about 65 wt %, or from 35 wt % to about 65 wt %, or from about 35 wt % to about 55 wt %, of the total weight of the process oil added in the present method.

In some embodiments, the process oil can be heated before addition of the oil to the extrusion reactor.

The inert solid particulate may be introduced to the extrusion reactor at the same location where the elastomer is added or may be introduced to the extrusion reactor downstream of the elastomer. In preferred embodiments, the inert solid particulate is introduced to the extrusion reactor at a location that is upstream of the first oil injection location. Without wishing to be bound by theory, it is believed that the addition of the inert solid particulate together with the elastomer pellets improves the mixing and melting quality of the elastomer and the thermoplastic resin.

The curative is added after the elastomer and thermoplastic resin is blended. After the addition of the curative, the elastomer and thermoplastic resin blend continues melt mixing to permit the dynamic crosslinking of the elastomer. Phase inversion then occurs as the crosslinking of the elastomer continues.

Other additives can be added prior to the addition of curative and initiation of crosslinking where such addition does not interfere with the crosslinking reaction or after the crosslinking reaction is nearly complete where there is no such interference.

In one or more embodiments, certain ingredients are added after dynamic vulcanization. As those skilled in the art appreciate, dynamic vulcanization may begin by including a greater volume fraction of elastomer than thermoplastic resin. As such, the thermoplastic resin may be present as the discontinuous phase when the elastomer volume fraction is greater than that of the volume fraction of the thermoplastic resin. As dynamic vulcanization proceeds, the viscosity of the elastomer increases and phase inversion occurs under dynamic mixing. In other words, upon phase inversion, the thermoplastic resin phase becomes the continuous phase. In certain embodiments, other ingredients, such as additional thermoplastic resins, additional thermoplastic vulcanizates, and/or pigments, may likewise be added after dynamic vulcanization. The presence of additional ingredients after dynamic vulcanization can be accomplished by employing a variety of techniques. In one embodiment, the additional ingredients can be added while the thermoplastic vulcanizate remains in its molten state from the dynamic vulcanization process. For example, the additional ingredients can be added downstream of the location of dynamic vulcanization within a process that employs continuous processing equipment, such as a single or twin screw extruder. In other embodiments, the thermoplastic vulcanizate can be "worked-up" or pelletized, subsequently melted, and the additional ingredients can be added to the molten thermoplastic vulcanizate product. This latter process may be referred to as a "second pass" addition of the ingredients.

The present method can provide a thermoplastic vulcanizate at an extrusion rate of at least about 60 kg/hour, or at least about 65 kg/hour, or at least 70 kg/hour, or at least about 75 kg/hour, or at least about 80 kg/hour, or at least about 85 kg/hour, or at least 90 kg/hour, or at least about 100 kg/hour, or at least 105 kg/hour, or at least about 110 kg/hour. Increased extrusion rates are advantageous for commercial production as more product can be made for a given amount of time. In some embodiments, in order to ensure complete mixing of the ingredients in the thermoplastic vulcanizate the method can have a TPV extrusion rate of less than about 120 kg/hr, or less than 115 kg/hour, or less than 110 kg/hour, or less than 105 kg/hour, or less than 100 kg/hour, or less than 95 kg/hour, or less than 90 kg/hour.

In some embodiments, the extrusion reactor is a multi-screw extruder, that is an extruder that utilizes two or more screws. In such embodiments, the thermoplastic vulcanizate may be produced at an extrusion rate that satisfies the following formula:

$$\text{Extrusion Rate} > k(Ex_D)^3 \cdot (L/2)$$

where $Ex_D$ is the diameter of the extrusion reactor in centimeters, L is the number of screws in the extrusion reactor, and k is a constant selected from 0.40, 0.44, 0.47, 0.50, and 0.53. Thus in some preferred embodiments, the extrusion reaction is operated at an extrusion rate that satisfies the formula: Extrusion Rate$>0.44(Ex_D)^3 \cdot (L/2)$, or the formula: Extrusion Rate$>0.50(Ex_D)^3 \cdot (L/2)$.

Product Characteristics

In one or more embodiments, the thermoplastic vulcanizate is cured to an extent such that the elastomer is completely or fully cured. In some embodiments, the thermoplastic vulcanizate is cured such that less than 5 wt %, or less than 4 wt %, or less than 3 wt % of the elastomer is extractable by cyclohexane at 23° C. Alternatively, in one or more embodiments, the elastomer has a degree of cure such that the crosslink density is preferably at least $4\times10^{-5}$, or at least $7\times10^{-5}$, or at least $10\times10^{-5}$ moles per milliliter of elastomer. See also "Crosslink Densities and Phase Morphologies in Dynamically Vulcanized TPEs," by Ellul et al, RUBBER CHEMISTRY AND TECHNOLOGY, Vol. 68, pp. 573-584 (1995).

Despite the fact that the elastomer may be fully cured, the thermoplastic vulcanizate can be processed and reprocessed by conventional plastic processing techniques such as extrusion, injection molding, blow molding, and compression molding. The elastomer within these thermoplastic vulcanizates can be in the form of finely-divided and well-dispersed particles of vulcanized or cured elastomer within a continuous thermoplastic phase or matrix. In other embodiments, a co-continuous morphology may exist. In those embodiments where the cured elastomer is in the form of finely-divided and well-dispersed particles within the thermoplastic medium, the elastomer particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

The thermoplastic vulcanizates can have an extrusion surface performance ("ESR") value (Ra) of not greater than about 130, or less than about 125, or less than about 120, or less than about 110, or less than about 100. In one or more embodiments, the ESR value is in the range of from about 20 to about 130, or from about 25 to about 120, or from 30 to 100, or from 30 to 90. The ESR is an extrusion property that can dictate the performance of the TPV in the final product in end-use applications. A lower ESR is indicative of the elastomer phase being more uniformly and well-dispersed within the continuous thermoplastic resin phase.

In certain preferred embodiments, the thermoplastic vulcanizates can have a specific gravity, s determined according to ASTM D-792, of less than about 0.980 g/cm³, or less than about 0.970 g/cm³, or less than about 0.960 g/cm³, or less than about 0.955 g/cm³, or less than about 0.950 g/cm³, or less than about 0.945 g/cm³, or less than about 0.940 g/cm³, or less than about 0.935 g/cm³ or less than about 0.930 g/cm³. In some embodiments, the thermoplastic vulcanizate can have a specific gravity of from about 0.920 to about 0.960 g/cm³, or from about 0.925 to about 0.955 g/cm³, or in the range within any two values described herein.

The thermoplastic vulcanizate composition can have a Shore A hardness from 30 to 100, or from 40 to 95, or from 50 to 90, wherein a desirable range may comprise any combination of any lower limit with any upper limit described herein. Shore hardness can be determined based on method ASTM D-2240.

The thermoplastic vulcanizate composition can have an ultimate tensile strength, determined based on method ASTM D-412, of from 5 MPa to 25 MPa, or from 5.5 to 10 MPa, or from 6 to 8 MPa, wherein a desirable range may comprise any combination of any lower limit with any upper limit described herein.

The thermoplastic vulcanizate composition can have a modulus at 100% extension, determined based on method ASTM D-412, of from 2 MPa to 10 MPa, or from 2.5 to 8 MPa, or from 3 to 5 MPa, wherein a desirable range may comprise any combination of any lower limit with any upper limit described herein.

The thermoplastic vulcanizate composition can have an elongation at break, determined based on method ASTM D-412, of from 100% to 800%, or from about 250 to 500%, or from 300% to 450%, wherein a desirable range may comprise any combination of any lower limit with any upper limit described herein.

INDUSTRIAL APPLICABILITY

The thermoplastic elastomer of this invention is useful for making a variety of articles such as weather seals, hoses, belts, gaskets, moldings, boots, elastic fibers and like articles. They are useful for making articles by blow molding, extrusion, injection molding, thermo-forming, elastic-welding, compression molding techniques, and by extrusion foaming More specifically, they are useful for making vehicle parts such as weather seals, brake parts such as cups, coupling disks, and diaparts by weightagm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced Vs, ground short fiber reinforced Vs or molded gum with short fiber flocked Vs. Foamed articles, such as weather seal extrudates for the construction and vehicle manufacture industries, and for liquid carrying hoses, e.g., underhood automotive, are also particularly well suited.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Materials Used in Examples

"V7001" was Vistalon™ 7001 EPDM rubber which is commercially available from ExxonMobil Chemical Company. V7001 is sold in pellet form. V7001 has an ethylene content of 73.0 wt % (ASTM D3900), an ethylidene norbornene content of 5.0 wt % (ASTM D6047), and has a Mooney Viscosity of 60 (ML 1+4, 125° C.) (ASTM D1646).

"PP5341" was ExxonMobil™ PP5341E1 polypropylene homopolymer which is commercially available from ExxonMobil Chemical Company. PP5341 is a polypropylene homopolymer that has a melt mass-flow rate (230° C., 2.16 kg) of 0.83 g/10 min (ASTM D1238) and a density of 0.9 g/cc.

"Clay" was Burgess Icecap K™ calcined kaolin clay which is commercially available from Burgess Pigment. The Clay has a specific gravity of 2.63 g/cc and an average particle size of 1.5 μm (sedigraph).

"ZnO" was Zoco 102 zinc oxide which is commercially available from Zochem Inc. The ZnO has a surface area of from 8 to 11 m2/g and a particle size of from 0.11 to 0.13 microns.

"SnCl2 MB" was an anhydrous stannous chloride polypropylene masterbatch that contained 55 wt % polypropylene having an MFR of 0.8 g/10 min (ASTM D1238; 230° C. and 2.16 kg weight) and 45 wt % anhydrous stannous chloride.

"Black MB" was a carbon black and polypropylene masterbatch that contained 57.75 wt % polypropylene homopolymer having an MFR of 35 g/10 min (ASTM D1238; 230° C. and 2.16 kg weight), 41.1 wt % carbon black, 1 wt % Kenamide S, and 0.25 wt % primary antioxidant.

"RIO" was a phenolic resin-in-oil curative that contained 30 wt % phenolic resin and 70 wt % oil.

"Oil" was Paralux 6001R Oil which is commercially available from Chevron Corporation, Houston, Tex.

Test Methods

Test specimens of the thermoplastic vulcanizates of the examples were molded at 190° C. for property testing as follows.

Hardness of the TPV was measured in Shore A units in accordance with ASTM D2240 (15 sec. delay).

Ultimate tensile strength ("UTS"), modulus at 100% extension ("M100"), and ultimate elongation ("UE %") were determined according to ASTM D-412 at 23° C. (unless otherwise specified) at 50 mm per minute by using an Instron testing machine.

Specific gravity ("SG") was determined according to ASTM D-792.

Tension set was determined according to ASTM D-412. Tension set is a measure of the permanent deformation of the TPV when it is stretched. In the test, a test specimen of dimensions 50.8 mm (2 in.) long, 2.54 mm (0.1 in.) wide, and 2.03 mm (0.08 in.) thick is cut from an injection molded plaque and is stretched to 100% and held for 10 minutes at 23° C. The specimen is then allowed to relax at 23° C. for 10 minutes. The change in the length of the original specimen is measured and the TnSet % is calculated according to the formula:

$$TnSet \% = ((L_i - L_o)/L_o) \times 100$$

where $L_o$ is the original length and $L_i$ is the final length.

Extrusion surface roughness ("ESR") in microinches (micrometers) was measured as follows: approximately 1 kg (2 lbs.) of the TPV to be tested was fed into a 1" or 1½" diameter extruder equipped with a 24:1 L/D screw having a 3.0 to 3.5 compression ratio. The extruder was fitted with a strip die 25.4 mm (1") wide×0.5 mm (0.019") thick×7 to 10 mm (0.25 to 0.40") length. A breaker plate was used with the die, but no screen pack was placed in front of the breaker plate. Temperature profiles of the extruder were as follows: Zone 1=180° C. (feed zone); Zone 2=190° C. (feed zone); Zone 3=200° C. (feed zone); Zone 4=205° C. (die zone). When the zone temperatures were reached, the screw was activated. Screw speed was set to maintain an output of approximately 50 grams per minute. For the first 5 minutes of extrusion the extruder was flushed and the extruded material was discarded. A strip approximately 30.5 cm (12") in length was extruded on a flat substrate placed directly under and touching the underside of the die. Three representative samples were collected in this manner. ESR was measured on the samples using a model EMD-04000-W5 Surfanalyzer System 4000 including a universal probe 200 mg stylus force and a Surfanalyzer proper tip type EPT-01049 (0.025 mm (0.0001") stylus radius).

Example 1

TPVs were prepared by dynamically vulcanizing rubbers within a twin-screw extruder by effecting vulcanization with a phenolic resin curative in the presence of stannous chloride masterbatch and zinc oxide. The formulations for each TPV of Example 1 are shown in Table 1, with the amount of each component listed in phr.

A co-rotating, fully intermeshing type twin screw extruder following a method similar to that described in U.S. Pat. No. 4,594,391 (excepting those altered conditions identified here). EPDM rubber was fed in pellet form into the feed throat of the extruder having a having a diameter of about 5.3 cm and a L/D (length of extruder over its diameter) ratio of about 44. The elastomer, thermoplastic resin, inert solid particulates, and filler, such as carbon black, were fed into the feed throat along with other reaction rate control agents such as zinc oxide and stannous chloride. Process oil was injected into the extruder at three different locations along the extruder as shown by the Barrel # in Table 1. The Barrel # in Table 1 indicates the location where the ingredient was added to the extruder: i.e., "1" refers to first barrel section of the extruder where the feed throat was located, "2D", "4D", "5D" and "10D" refer to the downstream barrel sections 2, 4, 5, and 10, respectively. After the initial ingredients were introduced at the feed throat, pre-curative process oil was added at two different locations, 2D and 4D. The twin-screw extruder used contained mixing elements between the 2D and 4D injection locations. The curative was injected into the extruder at location 5D. Additional post-curative process oil was then injected to the extruder at location 10D after the rubber crosslinking reactions were initiated. Tables 1 also shows certain processing conditions including the percentage of process oil addition at each location, extrusion rate and extruder rotation speed.

The extrusion took place at the rate and speed specified in Table 1. A barrel metal temperature profile in ° C., starting from barrel section 2 down towards the die to barrel section 12 of 160/160/160/160/165/165/165/165/180/180/180/180 (wherein the last value is for the die) was used. Low molecular weight contaminants, reaction by-products, residual moisture and the like were removed by venting through one or more vent ports, typically under vacuum, as needed. The final product was filtered using a melt gear pump and a filter screen of desired mesh size. A screw design with several mixing sections including a combination of forward convey, neutral, left handed kneading blocks and left handed convey elements to mix the process oil, cure agents and provide sufficient residence time and shear for completing cure reaction, without slip or surging in the extruder, were used.

TABLE 1

Example 1 Formulations and Properties

| Raw Material | Barrel # | TPV-A11 | TPV-A23 | TPV-A13 | TPV-A12 | TPV-A24 | TPV-A14 | TPV-A15 |
|---|---|---|---|---|---|---|---|---|
| V7001 | 1 | 100 | 100 | 100 | 100 | 100 | 100 | 100 |
| Clay | 1 | 42 | 42 | 42 | 42 | 42 | 7 | 7 |
| ZnO | 1 | 1.50 | 1.50 | 1.50 | 1.50 | 1.50 | 1.50 | 1.50 |

TABLE 1-continued

Example 1 Formulations and Properties

| Raw Material | Barrel # | TPV-A11 | TPV-A23 | TPV-A13 | TPV-A12 | TPV-A24 | TPV-A14 | TPV-A15 |
|---|---|---|---|---|---|---|---|---|
| SnCl2 MB | 1 | 1.67 | 1.67 | 1.67 | 1.67 | 1.67 | 1.67 | 1.67 |
| PP5341 | 1 | 50 | 50 | 50 | 50 | 50 | 50 | 50 |
| Black MB | 1 | 25.37 | 25.37 | 25.37 | 25.37 | 25.37 | 25.37 | 25.37 |
| RIO | 5D | 12.6 | 12.6 | 12.6 | 12.6 | 12.6 | 12.6 | 12.6 |
| Oil #1 | 2D | 30.00 | 16.48 | 22.16 | 58.70 | 29.17 | 29.25 | 29.98 |
| Oil #2 | 4D | 16.48 | 30.00 | 44.32 | 29.17 | 58.7 | 18.28 | 16.48 |
| Oil #3 | 10D | 80.00 | 80.00 | 60.00 | 38.60 | 38.60 | 69.47 | 80.01 |
| Total PHR |  | 359.62 | 359.62 | 359.62 | 359.61 | 359.61 | 315.14 | 324.61 |
| % of Total Oil Injected at $1^{st}$ Oil Injection Site |  | 23.7 | 13.0 | 17.5 | 46.4 | 23.1 | 25.0 | 23.7 |
| % of Total Oil Injected at $2^{nd}$ Oil Injection Site |  | 13.0 | 23.7 | 35.0 | 23.1 | 46.4 | 15.6 | 13.0 |
| % of Total Oil Injected at $3^{rd}$ Oil Injection Site |  | 63.3 | 63.3 | 47.4 | 30.5 | 30.5 | 59.4 | 63.3 |
| % of Total Oil Injected Precure |  | 36.7 | 36.7 | 52.6 | 69.5 | 69.5 | 40.6 | 36.7 |
| wt % of Oil in TPV Formulation |  | 35.2 | 35.2 | 35.2 | 35.2 | 35.2 | 37.1 | 39.0 |
| Extrusion Rate (kg/hr) |  | 75.0 | 75.0 | 75.0 | 75.0 | 75.0 | 87.0 | 75.0 |
| Extruder RPM |  | 300 | 300 | 300 | 300 | 300 | 300 | 300 |
| Extruder Load StdDev |  | 0.8 | 0.8 | 0.9 | 1.3 | 0.8 | 1.6 | 1.9 |
| Hardness (Shore A) |  | 78.30 | 78.30 | 80.80 | 80.80 | 80.30 | 80.40 | 79.90 |
| Ultimate Tensile Strength (MPa) |  | 6.92 | 7.74 | 7.54 | 7.68 | 7.32 | 7.77 | 6.19 |
| M100 (MPa) |  | 3.99 | 4.00 | 4.03 | 3.87 | 4.22 | 4.20 | 3.90 |
| Ultimate Elongation (%) |  | 340 | 365 | 349 | 415 | 400 | 344 | 380 |
| Specific Gravity (g/cc) |  | 0.9758 | 0.9788 | 0.9848 | 0.9758 | 0.9734 | 0.9116 | 0.9076 |
| Tension Set (%) |  | 2% | 2% | 2% | 2% | 2% | 1% | 1% |
| ESR (Ra) |  | 147 | 103 | 84 | 172 | 123 | 165 | 152 |

As seen in Table 1, when the amount of oil introduced at the first oil injection location was greater than that introduced at the second oil injection location (see TPV-A11 and TPV-A-12), the resulting thermoplastic vulcanizate had an increased ESR.

As seen in Table 1, when only 7 phr of the clay was introduced to the feed throat along with the other raw materials in TPV-A14 and TPV-A15, the extruder mixing became unstable as illustrated by the increased Extruder Load standard deviation. This manifested in an increased ESR of the thermoplastic vulcanizate.

Figure 1:
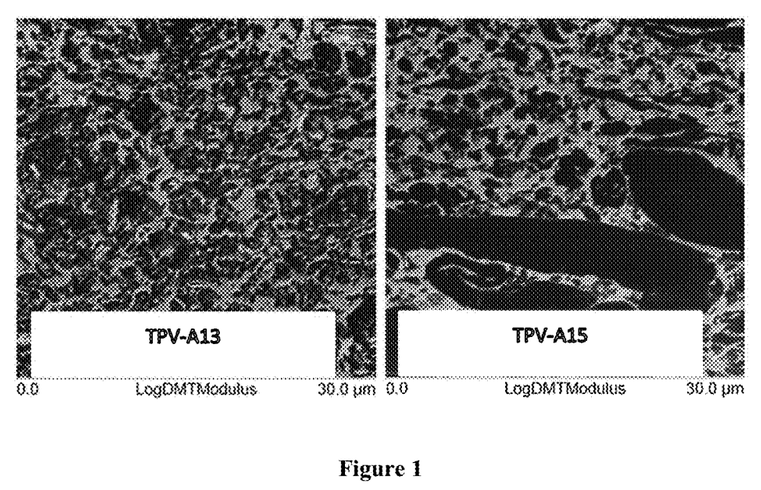
FIG. 1 shows AFM pictures of samples of TPV-A13 and TPV-A15 from Example 1.

FIG. 1 shows AFM pictures of TPV-A13 and TPV-A15. In the AFM images, the darker areas are the crosslinked elastomeric phase, while the lighter areas are the continuous thermoplastic phase. As seen in FIG. 1, the AFM picture of TPV-A15, which was formed using 7 phr of clay, shows larger crosslinked elastomer particles. It is the presence of these larger particles that lead to increased ESR of the thermoplastic vulcanizate. Conversely, the AFM picture of TPV-A13 shows evenly dispersed fine crosslinked elastomer particles within the continuous thermoplastic resin phase.

Example 2

In Example 2, TPVs were prepared according to the method of Example 1 using the conditions and formulations shown in Table 2A and Table 2B.

As seen in Table 2A and 2B, TPV-D25, TPV-D06, and TPV-D10, which were made using 7 phr of clay showed increased ESR. TPV-D14, which was also made using 7 phr of clay, had a decreased ESR as compared to the other TPVs made using 7 phr of clay. However, TPV-D14 was made at a lower extrusion rate. While, the lower extrusion rate helped better incorporate the oil into the thermoplastic vulcanizate and enabled more through mixing, lower extrusion rates are not always commercially viable.

Figure 2:
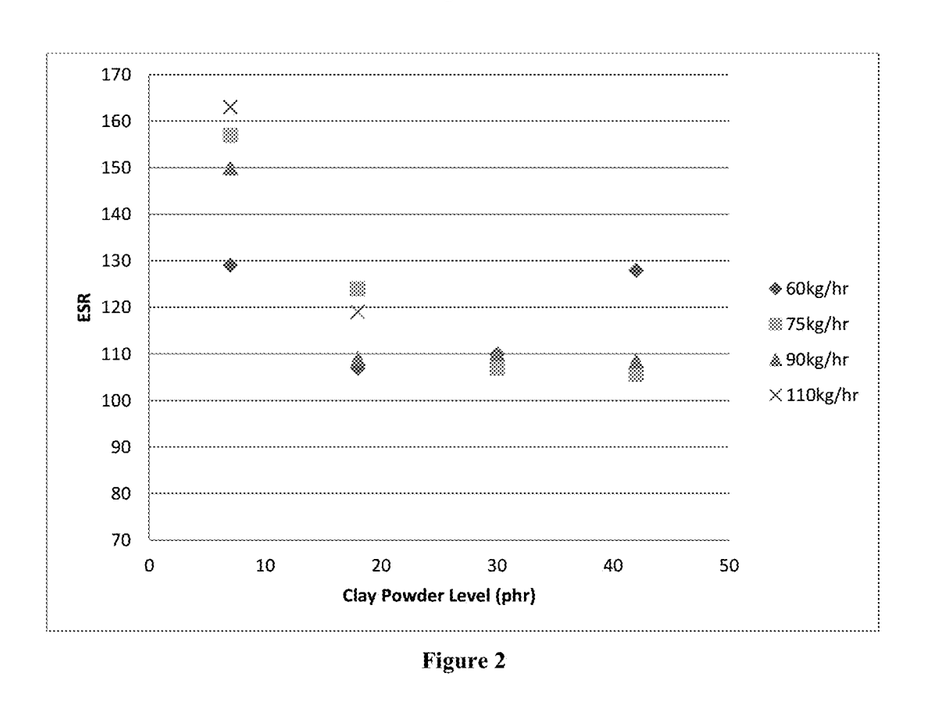
FIG. 2 compares the ESR of the thermoplastic vulcanizates of Example 2 with the amount of clay in each formulation at different extrusion rates.

FIG. 2 compares the average ESR of the thermoplastic vulcanizates of Example 2 with the amount of clay in each formulation when produced using different extrusion rates. In FIG. 2, the ESRs reported are the average ESR of the thermoplastic vulcanizates produced using the amount of clay at a specified extrusion rate.

TABLE 2A

Example 2 Formulations and Properties

| Raw Material | Barrel # | TPV-D03 | TPV-D25 | TPV-D01 | TPV-D02 | TPV-D04 | TPV-D05 | TPV-D06 | TPV-D07 | TPV-D15 | TPV-D16 |
|---|---|---|---|---|---|---|---|---|---|---|---|
| V7001 | 1 | 100 | 100 | 100 | 100 | 100 | 100 | 100 | 100 | 100 | 100 |
| Clay | 1 | 18 | 7 | 42 | 42 | 30 | 18 | 7 | 42 | 42 | 42 |
| ZnO | 1 | 1.50 | 1.50 | 1.50 | 1.50 | 1.50 | 1.50 | 1.50 | 1.50 | 1.50 | 1.50 |
| SnCl2 MB | 1 | 1.67 | 1.67 | 1.67 | 1.67 | 1.67 | 1.67 | 1.67 | 1.67 | 1.67 | 1.67 |
| PP5341 | 1 | 50 | 50 | 50 | 50 | 50 | 50 | 50 | 50 | 50 | 50 |
| Black MB | 1 | 25.37 | 25.37 | 25.37 | 25.37 | 25.37 | 25.37 | 25.37 | 25.37 | 25.37 | 25.37 |
| RIO | 5D | 12.6 | 12.6 | 12.6 | 12.6 | 12.6 | 12.6 | 12.6 | 12.6 | 12.6 | 12.6 |

TABLE 2A-continued

Example 2 Formulations and Properties

| Raw Material | Barrel # | TPV-D03 | TPV-D25 | TPV-D01 | TPV-D02 | TPV-D04 | TPV-D05 | TPV-D06 | TPV-D07 | TPV-D15 | TPV-D16 |
|---|---|---|---|---|---|---|---|---|---|---|---|
| Oil #1 | 2D | 9.61 | 9.61 | 22.13 | 9.61 | 9.61 | 9.61 | 9.61 | 9.61 | 9.61 | 9.61 |
| Oil #2 | 4D | 56.91 | 56.91 | 44.90 | 56.91 | 56.91 | 56.91 | 56.91 | 56.91 | 56.91 | 56.91 |
| Oil #3 | 10D | 59.95 | 59.95 | 59.95 | 59.95 | 59.95 | 59.95 | 59.95 | 59.95 | 59.95 | 79.95 |
| Total PHR | | 335.62 | 324.62 | 360.12 | 359.62 | 347.62 | 335.62 | 325.62 | 359.62 | 359.62 | 379.62 |
| % of Total Oil Injected at $1^{st}$ Oil Injection Site | | 7.6 | 7.6 | 17.4 | 7.6 | 7.6 | 7.6 | 7.6 | 7.6 | 7.6 | 6.6 |
| % of Total Oil Injected at $2^{nd}$ Oil Injection Site | | 45.0 | 45.0 | 35.4 | 45.0 | 45.0 | 45.0 | 45.0 | 45.0 | 45.0 | 38.9 |
| % of Total Oil Injected at $3^{rd}$ Oil Injection Site | | 47.4 | 47.4 | 47.2 | 47.4 | 47.4 | 47.4 | 47.4 | 47.4 | 47.4 | 54.6 |
| % of Total Oil Injected Precure | | 52.6 | 52.6 | 52.8 | 52.6 | 52.6 | 52.6 | 52.6 | 52.6 | 52.6 | 45.4 |
| wt % of Oil in TPV Formulation | | 37.7 | 39.0 | 35.3 | 35.2 | 36.4 | 37.7 | 39.0 | 35.2 | 35.2 | 38.6 |
| Extrusion Rate (kg/hr) | | 110.0 | 110.0 | 90.0 | 90.0 | 90.0 | 90.0 | 90.0 | 75.0 | 75.0 | 75.0 |
| Extruder RPM | | 300 | 300 | 300 | 300 | 300 | 300 | 300 | 300 | 300 | 300 |
| Hardness (Shore A) | | 69.4 | 66.4 | 71.2 | 68.8 | 67.8 | 70.2 | 68.6 | 70.0 | 65.4 | 63.2 |
| Specific Gravity (g/cc) | | 0.947 | 0.916 | 0.985 | 0.987 | 0.980 | 0.938 | 0.919 | 0.982 | 0.980 | 0.969 |
| ESR (Ra) | | 119 | 163 | 109 | 108 | 110 | 109 | 150 | 118 | 102 | 111 |

TABLE 2B

Example 2 Formulations and Properties

| Raw Material | Barrel # | TPV-D17 | TPV-D18 | TPV-D08 | TPV-D09 | TPV-D10 | TPV-D11 | TPV-D12 | TPV-D13 | TPV-D14 |
|---|---|---|---|---|---|---|---|---|---|---|
| V7001 | 1 | 100 | 100 | 100 | 100 | 100 | 100 | 100 | 100 | 100 |
| Clay | 1 | 42 | 42 | 30 | 18 | 7 | 42 | 30 | 18 | 7 |
| ZnO | 1 | 1.50 | 1.50 | 1.50 | 1.50 | 1.50 | 1.50 | 1.50 | 1.50 | 1.50 |
| SnCl2 MB | 1 | 1.67 | 1.67 | 1.67 | 1.67 | 1.67 | 1.67 | 1.67 | 1.67 | 1.67 |
| PP5341 | 1 | 50 | 50 | 50 | 50 | 50 | 50 | 50 | 50 | 50 |
| Black MB | 1 | 25.37 | 25.37 | 25.37 | 25.37 | 25.37 | 25.37 | 25.37 | 25.37 | 25.37 |
| RIO | 5D | 12.6 | 12.6 | 12.6 | 12.6 | 12.6 | 12.6 | 12.6 | 12.6 | 12.6 |
| Oil #1 | 2D | 11.13 | 8.30 | 9.61 | 9.61 | 9.61 | 9.61 | 9.61 | 9.61 | 9.61 |
| Oil #2 | 4D | 65.92 | 49.14 | 56.91 | 56.91 | 56.91 | 56.91 | 56.91 | 56.91 | 56.91 |
| Oil #3 | 10D | 69.44 | 69.03 | 59.95 | 59.95 | 59.95 | 59.95 | 59.95 | 59.95 | 59.95 |
| Total PHR | | 379.63 | 359.61 | 347.62 | 335.62 | 324.62 | 359.62 | 347.62 | 335.62 | 324.62 |
| % of Total Oil Injected at $1^{st}$ Oil Injection Site | | 7.6 | 6.6 | 7.6 | 7.6 | 7.6 | 7.6 | 7.6 | 7.6 | 7.6 |
| % of Total Oil Injected at $2^{nd}$ Oil Injection Site | | 45.0 | 38.9 | 45.0 | 45.0 | 45.0 | 45.0 | 45.0 | 45.0 | 45.0 |
| % of Total Oil Injected at $3^{rd}$ Oil Injection Site | | 47.4 | 54.6 | 47.4 | 47.4 | 47.4 | 47.4 | 47.4 | 47.4 | 47.4 |
| % of Total Oil Injected Precure | | 52.6 | 45.4 | 52.6 | 52.6 | 52.6 | 52.6 | 52.6 | 52.6 | 52.6 |
| wt % of Oil in TPV Formulation | | 38.6 | 35.2 | 36.4 | 37.7 | 39.0 | 35.2 | 36.4 | 37.7 | 39.0 |
| Extrusion Rate (kg/hr) | | 75.0 | 75.0 | 75.0 | 75.0 | 75.0 | 60.0 | 60.0 | 60.0 | 60.0 |
| Extruder RPM | | 300 | 300 | 300 | 300 | 300 | 300 | 300 | 300 | 300 |
| Hardness (Shore A) | | 62.6 | 65.6 | 70.0 | 69.2 | 67.0 | 69.0 | 69.4 | 65.5 | 64.8 |
| Specific Gravity (g/cc) | | 0.961 | 0.981 | 0.957 | 0.937 | 0.913 | 0.983 | 0.958 | 0.940 | 0.916 |
| ESR (Ra) | | 109 | 88 | 107 | 124 | 157 | 128 | 110 | 107 | 129 |

As seen from the examples, TPVs having good extrusion properties can be made using non-oil extended EPDM rubber pellets, when the process oil is introduced to the extrusion reactor at multiple locations, where the amount of oil introduced at the first oil injection location is less than that introduced at the second oil injection location. Further, when inert solid particulates, such as clay, were added to the thermoplastic vulcanizate in an amount of at least 7 phr, the resulting thermoplastic vulcanizates had lower ESR values, indicating improved extrusion surface performance, while having comparable mechanical properties.

Another advantage that can be seen from the examples is that as a pelletized elastomer was used, the method for forming the TPV was simplified as there was no need for pre-treatment, such as a cutting step, of the rubber.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A method for making a thermoplastic vulcanizate, the method comprising the steps of:
   (i) introducing an elastomer to an extrusion reactor, wherein the elastomer comprises less than about 25 phr of extender oil;
   (ii) introducing a thermoplastic resin to the extrusion reactor;
   (iii) introducing at least 7 phr of an inert solid particulate to the extrusion reactor;
   (iv) introducing a first amount of process oil to the extrusion reactor at a first oil injection location;
   (v) introducing a second amount of process oil to the extrusion reactor at a second oil injection location, where the second oil injection location is downstream of the first oil injection location, and wherein the second amount of process oil is greater than the first amount of process oil;
   (vi) introducing a curative to the extrusion reactor a location that is downstream of the second oil injection location;
   (vii) introducing a third amount of process oil to the extrusion reactor at a third oil injection location, where the third oil injection location is downstream of the location where the curative is introduced to the extrusion reactor; and
   (viii) dynamically vulcanizing the elastomer with the curative in the presence of the thermoplastic resin to form the thermoplastic vulcanizate;
   wherein the total weight percent of oil in the thermoplastic vulcanizate is greater than 25 wt % based on the weight of the thermoplastic vulcanizate; and
   wherein the amount of process oil injected at the first and second oil injection locations comprises at least 30 wt % of the total weight of the process oil introduced to the extrusion reactor, wherein the extrusion reactor operates at an extrusion rate of from about 50 kg/hr to about 120 kg/hr.

2. The method of claim 1, wherein the inert solid particulate is selected from the group consisting of clay, carbon black, talc, calcium carbonate, silica, alumina, titanium dioxide, wood flour, and combinations thereof.

3. The method of claim 1, wherein the inert solid particulate comprises clay.

4. The method of claim 1, wherein the inert solid particulate has an average diameter of less than about 10 micrometer.

5. The method of claim 1, wherein the inert solid particulate is added in an amount of from about 10 phr to about 50 phr.

6. The method of claim 1, wherein the inert solid particulate is added in an amount of from about 10 phr to about 40 phr.

7. The method of claim 1, wherein the elastomer comprises an ethylene-propylene-diene copolymer.

8. The method of claim 1, wherein the elastomer comprises less than about 10 phr extender oil.

9. The method of claim 1, wherein the elastomer comprises less than about 5 phr of extender oil.

10. The method of claim 1, wherein the elastomer being added to the extrusion reactor is substantially free of extender oil.

11. The method of claim 1, wherein about 10 wt % to about 60 wt % of the total amount of process oil is introduced to the extrusion reactor at the second oil injection location.

12. The method of claim 1, wherein the oil injected at the first and second oil injection locations comprises from about 30 wt % to about 70 wt % of the total weight of the process oil introduced to the extrusion reactor.

13. The method of claim 1, wherein the oil injected at the first and second oil injection locations comprises from about 35 wt % to about 65 wt % of the total weight of the process oil introduced to the extrusion reactor.

14. The method of claim 1, wherein the total weight percent of oil in the thermoplastic vulcanizate is greater than 30 wt % based on the weight of the thermoplastic vulcanizate.

15. The method of claim 1, wherein the total weight percent of oil in the thermoplastic vulcanizate is greater than 35 wt % based on the weight of the thermoplastic vulcanizate.

16. The method of claim 1, wherein the curative comprises a phenolic resin.

17. The method of claim 1, wherein the extrusion reactor is a multi-screw extruder that operates at an extrusion rate that satisfies the following formula:

$$\text{Extrusion Rate} > 0.44(Ex_D)^3 \cdot (L/2)$$

where $Ex_D$ is the diameter of the extrusion reactor in centimeters and L is the number of screws in the extrusion reactor.

18. The method of claim 1, wherein the extrusion reactor is a multi-screw extruder that operates at an extrusion rate that satisfies the following formula:

$$\text{Extrusion Rate} > 0.50(Ex_D)^3 \cdot (L/2)$$

where $Ex_D$ is the diameter of the extrusion reactor in centimeters and L is the number of screws in the extrusion reactor.

19. The method of claim 1, wherein the extrusion reactor operates at an extrusion rate of from about 60 kg/hr to about 90 kg/hr.

20. The method of claim 1, wherein the extrusion reactor is a twin-screw extruder.

21. The method of claim 20, wherein the twin-screw extruder comprises mixing elements between the first oil injection location and the second oil injection location.

22. A thermoplastic vulcanizate made by the method of claim 1.

23. The thermoplastic vulcanizate of claim 22, wherein the thermoplastic vulcanizate has a specific gravity, as determined according to ASTM D-792, of from about 0.900 g/cm$^3$ to about 0.990 g/cm$^3$.

24. The thermoplastic vulcanizate of claim 22, wherein the thermoplastic vulcanizate has an extrusion surface roughness value of less than about 130 Ra.

25. The method of claim 1, wherein the elastomer is added to the extrusion reactor in the form of pellets having an average diameter of from 1.0 mm to 10 mm.

26. The method of claim 1, wherein the thermoplastic vulcanizate comprises elastomer in an amount of from 10 to 80 wt %, based on the total weight of the thermoplastic vulcanizate.

27. The method of claim 1, wherein the elastomer has a Mooney viscosity of from 5 to 70 (ML(I+4@125 C) in Mooney units according to ASTM D-1646).

* * * * *